No. 610,068. Patented Aug. 30, 1898.
L. T. LAPAUGH.
BICYCLE LOCK.
(Application filed July 14, 1897.)
(No Model.)
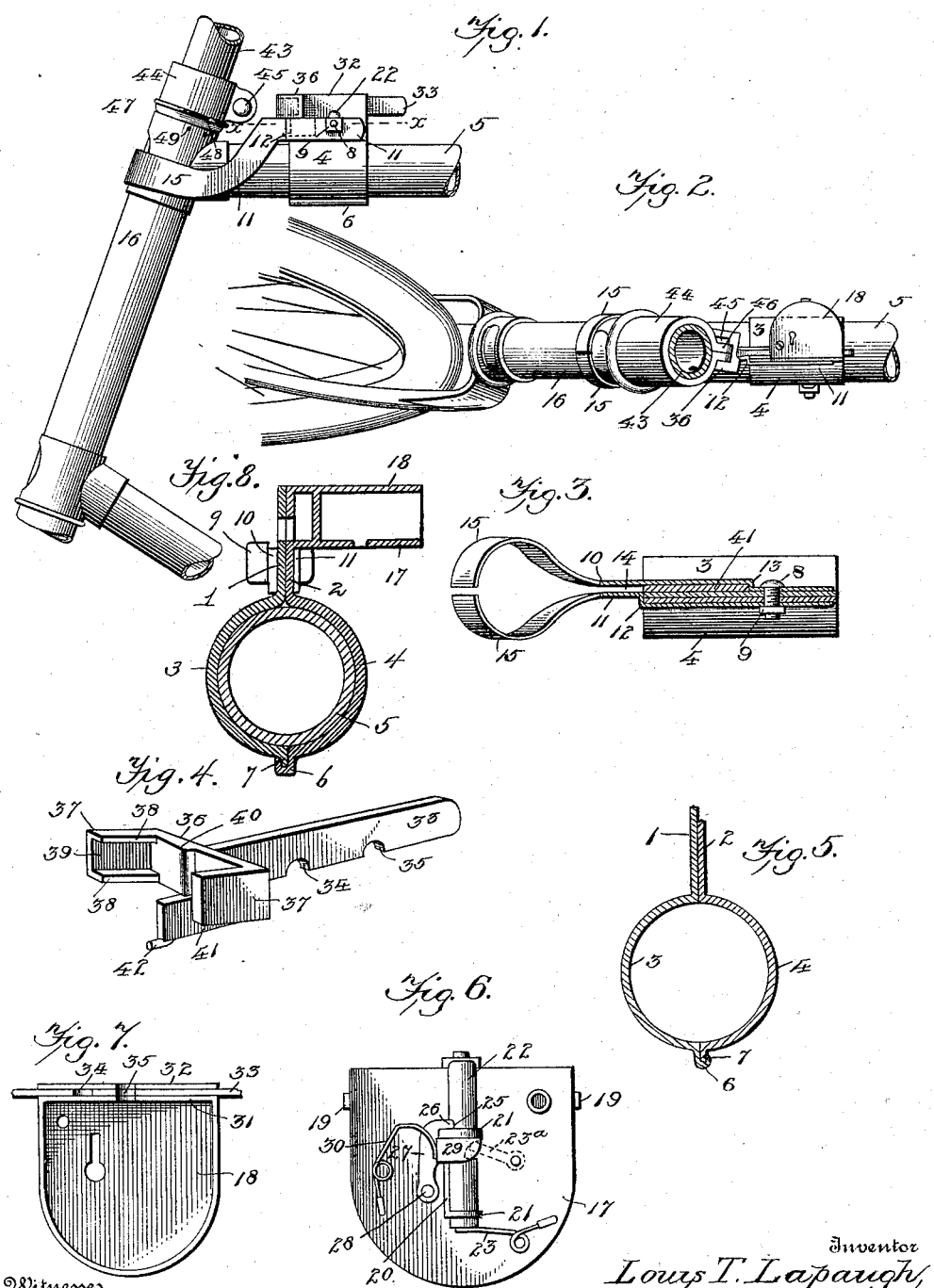

UNITED STATES PATENT OFFICE.

LOUIS T. LAPAUGH, OF UTICA, NEW YORK.

BICYCLE-LOCK.

SPECIFICATION forming part of Letters Patent No. 610,068, dated August 30, 1898.

Application filed July 14, 1897. Serial No. 644,557. (No model.)

*To all whom it may concern:*

Be it known that I, LOUIS T. LAPAUGH, of Utica, in the county of Oneida and State of New York, have invented certain new and useful Improvements in Bicycle-Locks; and I do hereby declare the following to be a full, clear, and exact description of the invention, such as will enable others skilled in the art to which it appertains to make and use the same.

This invention relates to locks designed especially for use on bicycles and other foot-propelled vehicles.

The object of the invention is to provide a simple, convenient, and reliable lock for the purpose of holding the steering-wheel of the machine at such an angle as to prevent the machine from being surreptitiously ridden by an unauthorized person.

It is also the object of the invention to provide a lock which can be readily applied to and used in connection with any ordinary safety-bicycle whether of the diamond-frame or drop-frame pattern.

Other objects and advantages of the invention will be pointed out in the course of the subjoined description.

The invention consists in a lock for the purpose specified embodying certain novel features and details of construction and arrangement of parts, as hereinafter fully described, illustrated in the drawings, and incorporated in the claims hereto appended.

In the accompanying drawings, Figure 1 is a side elevation of a sufficient portion of the frame of a bicycle to illustrate the application of the improved lock thereto. Fig. 2 is a plan view of the same, partly in section, showing the lock in its operative position. Fig. 3 is a detail horizontal section through the upper portion of the lock, taken on the line $x$ $x$ of Fig. 1. Fig. 4 is a detail perspective view of the bolt and its head for engaging the clamp-collar on the handle-bar stem of the machine. Fig. 5 is a detail vertical section through the clamp members, showing their interlocking engagement. Fig. 6 is a plan view of the lock-case with the upper portion thereof removed to show the internal mechanism. Fig. 7 is a reverse view of the upper portion of the lock-case, showing also a portion of the reciprocating bolt. Fig. 8 is a cross-sectional view showing the manner of attaching the lock-case to the clip.

Similar numerals of reference designate corresponding parts in all the views.

In carrying out the present invention I provide a clip which is composed of two members 1 and 2, said members being in the form of plates having their upper ends bearing against each other, as shown in Figs. 3 and 5, while their lower portions are deflected in opposite directions to form semicircular clasps 3 and 4, adapted to embrace the upper bar 5 of an ordinary diamond-frame bicycle on opposite sides. The lower edge of one of the members is provided with a longitudinally-extending hook 6, in which the downturned or pendent edge 7 of the other member is received, said lip and hook providing means whereby the members of the clip are interlocked on the under side of the bar 5 of the machine. Above the bar 5 the plates are provided with transversely-alining openings to receive a bolt 8, provided with a nut 9, whereby the said plates are held together.

10 and 11 designate a pair of arms which are secured on opposite sides of the members 1 and 2 by means of the same bolt 8, which connects said members. The arm 11 is offset, as indicated at 12, to extend around the edges of the members 1 and 2, as shown in Fig. 3, and the arm 10 is offset at 13 to leave a space 14 between the two arms 10 and 11 for the reciprocation of a guide-plate, hereinafter described in connection with the bolt. The arms 10 and 11 extend forward and are provided at their advance ends with semicircular clasps 15, which embrace the head-tube 16 of the machine.

Extending laterally and horizontally from one of the clip members is a lock-case comprising a lower plate 17 and an upper plate 18, connected by a depending rim to the lower plate for inclosing the parts of the mechanism hereinafter described. The plate 17 is formed by bending the upper portion of the body 2 outward at a right angle. The lower plate 17 is provided with lips or projections 19 for engaging such rim and holding the two parts of the lock-case in proper relation to each other. The upper and lower plates of the lock-case may be held together by one or more screws.

Upon the lower plate is a flange 20, having at its opposite ends eyes or guides 21, through which a bolt 22 is adapted to reciprocate. The bolt 22 is half round or provided with a flat under side, as shown in Fig. 1, so that when the bolt is thrust outward the flat side will engage one of the flat sides of the nut 9, thus forming a lock for the nut. Behind the bolt is arranged a spring 23 for normally forcing the bolt outward, the bolt being retracted or drawn inward by means of a key, (indicated in dotted lines at 23$^a$ in Fig. 6,) the bit of the key engaging in a notch in one side of the bolt 22. The bolt 22 is provided on the other side with a second notch 25, in which engages the angular lip 26 of a tumbler 27, pivoted at 28 on the plate 17. The tumbler is provided with an L-shaped projection 29, which extends over the bolt 22, adapting it to be engaged by the bit of the key 23$^a$, which operates upon the tumbler to rock the same on its pivot and move the lip 25 out of engagement with the bolt preparatory to the drawing inward of the bolt by the key. The tumbler is backed up by a spring 30, secured to the plate 17 and serving to maintain the tumbler normally in engagement with said bolt. When the key is inserted in the lock and turned, it first acts to thrust the tumbler aside and then operates within the notch of the bolt to withdraw the bolt in a manner that will be readily understood.

Extending parallel to the inner side 31 of the rim of the lock-case is a web or flange 32, and between the parts 31 and 32, depending from the upper plate 18, is slidingly arranged a bolt 33, having in its lower edge two notches 34 and 35, adapted to receive and be engaged by the bolt 22. The bolt 33 is provided with a head comprising a transverse portion or bar 36, having at its ends forwardly-projecting ears 37 one of which has inwardly-extending flanges 38 to form a groove or socket 39. The cross-bar 36 is also thickened to form a seat 40, the purpose of which will appear. Depending from the bolt 33 is a guide-plate 41, which moves between the arms 10 and 11 and serves to guide and steady said bolt. Projecting forward from the lower edge of the guide-plate 41 is a stud 42. Surrounding the handle-bar stem 43 of the machine is the usual clamp-collar 44, having a clamping-screw 45. The head of this screw is of the usual square form and is adapted to be received in the socket 39 of the head of the bolt 33 and between the flanges 38, while one side of the head of the screw 45 bears against the seat 40, provided for that purpose. The ears or flanges 37 are set at an angle or extend obliquely to the bolt 33 and are adapted to embrace the rearwardly-projecting ears 46 of the clamp-collar 44 when the handle-bar and steering-wheel are turned at an angle, as shown in Fig. 2. It is also desirable to provide the ball-cup 47 with notches 48 to receive the guide-plate 41, and the head-tube 16 may also be provided with openings 49 to receive the stud 42, above described.

The object in providing the notches 48 and openings 49 is to enable the steering-wheel to be locked at a greater angle than the headed bolt 33 would admit of. When the bolt is withdrawn from engagement with the clamp-collar 44, the lock-bolt 22 engages the forward notch 34 in the bolt 33. When the steering-wheel is locked at an angle and the bolt 33 moved forward, the lock-bolt 32 engages the rear notch 35.

From the foregoing description it will be seen that I have provided a simple, inexpensive, and reliable lock for holding the steering-wheel of a bicycle at various angles, thus preventing the machine from being ridden by an unauthorized person.

The lock may be quickly manipulated by simply inserting the key in the lock-case and grasping the head of the bolt 33 and moving it in one direction or the other.

I do not desire to limit myself to the mounting of the lock upon the upper bar of the machine-frame, as it may be also applied to the lower reach-bar, the latter being especially the case where the lock is placed upon a lady's wheel.

It will be apparent that the lock hereinabove described is susceptible to various changes in the form, proportion, and minor details of construction, which may accordingly be resorted to without departing from the principle or sacrificing any of the advantages of the invention.

The tumbler mechanism herein described may be varied or substituted by other mechanism, as it forms no part of this invention, and likewise no claim is made herein to the particular manner of forming the offsets 12 and 13 in the arms 10 and 11 nor to the seat 40 for the head of the clamping-screw.

Having thus described the invention, what is claimed as new, and desired to be secured by Letters Patent, is—

1. In a lock of the character described, a two-part clip, arms connected thereto and spaced slightly apart and also adapted to embrace the head of the machine, securing means for the two parts of the clip a notched reciprocating bolt mounted on the clip and having a guide-plate traveling between said arms, a flat-sided locking-bolt adapted to engage one of a series of notches in the reciprocating bolt, and also to lock said securing means and means for operating said locking-bolt, substantially as described.

2. In a lock of the character described, the combination with the clamp-collar of a safety-bicycle, of a reciprocating bolt mounted on the machine and having a flanged head embodying obliquely-disposed ears to engage said clamp-collar and hold the steering-wheel at an angle, and means for locking said bolt when adjusted, substantially as described.

3. The combination with a bicycle having the usual clamp-collar on the handle-bar stem, of a reciprocating bolt having a flanged head embodying obliquely-disposed ears to engage said clamp-collar, one of said ears being provided with a socket to receive the head of the clamping-screw and locking means for holding said reciprocating bolt, substantially as described.

4. In a lock of the character described, the combination with the head-clamp of a bicycle, of a reciprocating bolt mounted on the machine and provided with a head embodying oppositely-arranged ears to engage the clamp-collar, and flanges on one of said ears to embrace the head of the clamping-screw, substantially as described.

5. In a lock of the character described, the combination with the usual clamping-collar of a bicycle, of a reciprocating bolt, a guide-plate on said bolt adapted to engage notches in the ball-cup on the machine-head, a stud on said guide-plate for engaging one of a series of openings in the head-tube, and means for locking said bolt when adjusted, substantially as described.

6. In a lock of the character described, the combination with a reciprocating bolt having a flanged head for engaging the usual clamp-collar on the handle-bar stem of a bicycle, of a clip in which the reciprocating bolt is mounted, said clip being composed of two members adapted to embrace one of the machine-bars and connected by a bolt passing therethrough and having a flat-sided nut thereon, a flat-sided locking-bolt for engaging the reciprocating bolt and also forming a lock for the aforesaid nut, and means for reciprocating said locking-bolt, substantially as described.

In testimony whereof I have signed this specification in the presence of two subscribing witnesses.

LOUIS T. LAPAUGH.

Witnesses:
JOHN E. DAY,
JOHN A. HOBBES.